(12) United States Patent
Kishimoto et al.

(10) Patent No.: US 9,941,513 B2
(45) Date of Patent: Apr. 10, 2018

(54) POSITIVE ELECTRODE OF LITHIUM ION SECONDARY BATTERY, AND METHOD OF MANUFACTURING LITHIUM ION SECONDARY BATTERY

(71) Applicant: TOYOTA JIDOSHA KABUSHIKI KAISHA, Toyota-shi, Aichi-ken (JP)

(72) Inventors: Naoya Kishimoto, Nagoya (JP); Masanori Kitayoshi, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 59 days.

(21) Appl. No.: 15/123,403

(22) PCT Filed: Feb. 24, 2015

(86) PCT No.: PCT/IB2015/000215
§ 371 (c)(1),
(2) Date: Sep. 2, 2016

(87) PCT Pub. No.: WO2015/132641
PCT Pub. Date: Sep. 11, 2015

(65) Prior Publication Data
US 2017/0077502 A1    Mar. 16, 2017

(30) Foreign Application Priority Data

Mar. 3, 2014   (JP) .................. 2014-040204

(51) Int. Cl.
*H01M 4/36* (2006.01)
*H01M 10/0525* (2010.01)
(Continued)

(52) U.S. Cl.
CPC ............ *H01M 4/366* (2013.01); *C01G 53/54* (2013.01); *H01M 4/0447* (2013.01);
(Continued)

(58) Field of Classification Search
CPC .. H01M 4/366; H01M 10/0525; H01M 4/525; H01M 4/628; H01M 4/0447; H01M 4/131; C01G 53/54
See application file for complete search history.

(56) References Cited

U.S. PATENT DOCUMENTS

2010/0233550 A1    9/2010   Yanagida et al.
2010/0247986 A1*  9/2010   Toyama ................ H01M 4/366
                                                                                        429/61
(Continued)

FOREIGN PATENT DOCUMENTS

EP    2237348 A1    10/2010
JP    2002-527873 A    8/2002
(Continued)

*Primary Examiner* — Stewart A Fraser
(74) *Attorney, Agent, or Firm* — Sughrue Mion, PLLC

(57) ABSTRACT

In a method of manufacturing a lithium ion secondary battery, first, lithium nickel manganese oxide which is a positive electrode active material is exposed to fluorine-based gas to form a coating film containing amorphous lithium fluoride on a surface of the positive electrode active material. Next, a phosphate compound is added to the positive electrode active material on which the coating film containing the lithium fluoride is formed. After a lithium ion secondary battery which includes a positive electrode including the positive electrode active material is formed, the lithium ion secondary battery is charged to form a coating film containing amorphous lithium phosphate on the surface of the positive electrode active material.

11 Claims, 5 Drawing Sheets

(51) Int. Cl.
  *H01M 4/04* (2006.01)
  *H01M 4/131* (2010.01)
  *H01M 4/1391* (2010.01)
  *H01M 4/505* (2010.01)
  *H01M 4/525* (2010.01)
  *H01M 4/62* (2006.01)
  *H01M 10/04* (2006.01)
  *C01G 53/00* (2006.01)
  *H01M 4/02* (2006.01)

(52) U.S. Cl.
  CPC ......... *H01M 4/0469* (2013.01); *H01M 4/131* (2013.01); *H01M 4/1391* (2013.01); *H01M 4/505* (2013.01); *H01M 4/525* (2013.01); *H01M 4/628* (2013.01); *H01M 10/049* (2013.01); *H01M 10/0525* (2013.01); *C01P 2004/80* (2013.01); *C01P 2006/40* (2013.01); *H01M 2004/028* (2013.01)

(56) References Cited

U.S. PATENT DOCUMENTS

2011/0183204 A1* 7/2011 Jones .................. H01M 4/587
    429/217
2014/0234701 A1 8/2014 Tanaka et al.

FOREIGN PATENT DOCUMENTS

| | | |
|---|---|---|
| JP | 2010-232001 A | 10/2010 |
| JP | 2011-034943 A | 2/2011 |
| JP | 2012-084547 A | 4/2012 |
| JP | 2013-084547 A | 5/2013 |
| WO | 00/22686 A1 | 4/2000 |
| WO | 2012/176903 A1 | 12/2012 |
| WO | 2013/054743 A1 | 4/2013 |

\* cited by examiner

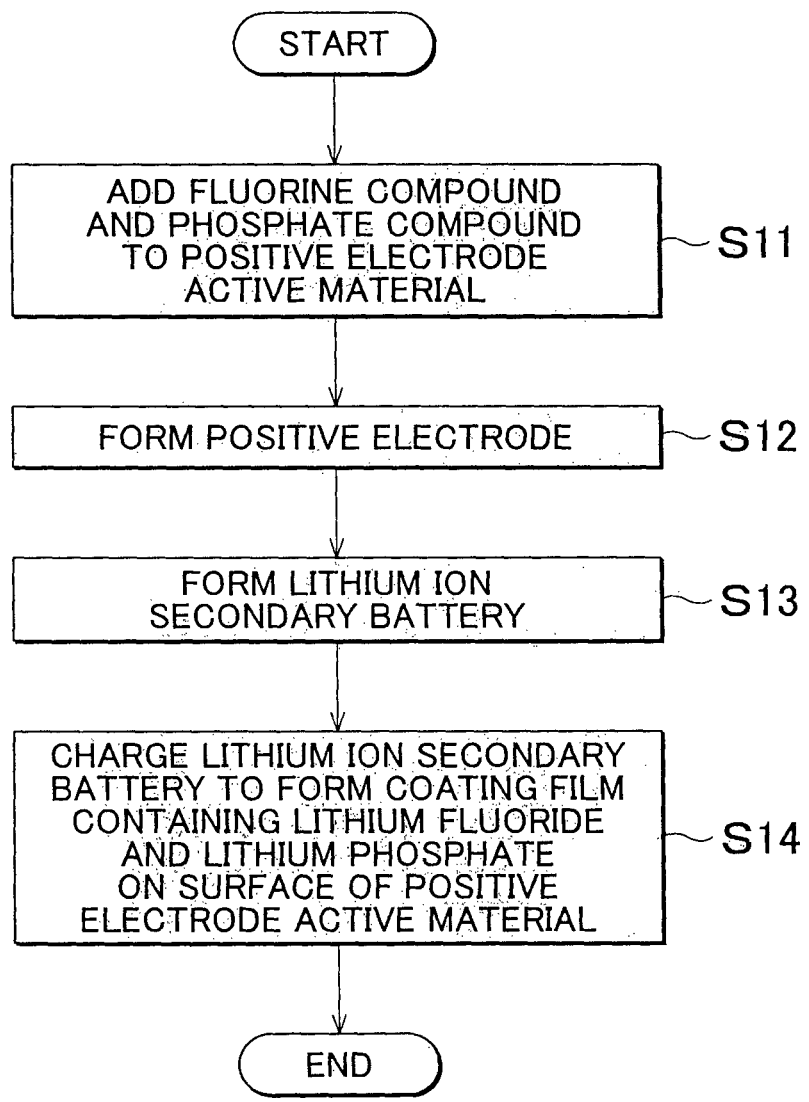

FIG. 3

| SAMPLE | AMOUNT OF LiF (wt%) | AMOUNT OF Li$_3$PO$_4$ (wt%) | CAPACITY RETENTION (%) (AFTER 200 CYCLES) | DESCRIPTION OF SAMPLE |
|---|---|---|---|---|
| EXAMPLE 1 | 0.3 | 1.0 | 93.0 | FIRST METHOD |
| EXAMPLE 2 | 0.1 | 1.0 | 89.9 | FIRST METHOD |
| EXAMPLE 3 | 0.3 | 1.0 | 92.1 | SECOND METHOD |
| EXAMPLE 4 | 0.1 | 1.0 | 89.0 | SECOND METHOD |
| COMPARATIVE EXAMPLE 1 | — | — | 79.2 | ADDITIVES NOT ADDED |
| COMPARATIVE EXAMPLE 2 | 0.3 | 1.0 | 76.7 | ADDITIVES ADDED TO ELECTROLYTE |
| COMPARATIVE EXAMPLE 3 | 0.3 | 1.0 | 86.3 | CRYSTALLINE COATING FILM FORMED |
| COMPARATIVE EXAMPLE 4 | — | 1.0 | 84.3 | LiF NOT ADDED |
| COMPARATIVE EXAMPLE 5 | 0.3 | — | 79.6 | Li$_3$PO$_4$ NOT ADDED |

| | | AMOUNT OF LiF [wt%] | | | | | | |
|---|---|---|---|---|---|---|---|---|
| | | 0 | 0.03 | 0.05 | 0.1 | 0.3 | 0.5 | 1 | 1.5 |
| AMOUNT OF Li₃PO₄ [wt%] | 0 | 79.2 | 79.3 | 79.4 | 79.5 | 79.6 | 79.6 | 79.4 | 79.2 |
| | 0.25 | 81.6 | 82.9 | 84.8 | 85.3 | 87.2 | 85.0 | 83.1 | 82.0 |
| | 0.5 | 83.4 | 84.0 | 87.5 | 88.9 | 90.9 | 89.1 | 87.8 | 86.3 |
| | 1 | 84.3 | 87.4 | 89.2 | 90.7 | 92.1 | 90.0 | 88.4 | 87.4 |
| | 1.5 | 84.2 | 87.0 | 88.5 | 89.6 | 91.6 | 88.2 | 88.0 | 87.2 |
| | 3 | 84.1 | 86.5 | 88.2 | 88.8 | 90.5 | 87.8 | 87.6 | 86.9 |
| | 5 | 82.1 | 84.8 | 86.8 | 87.2 | 87.8 | 86.6 | 85.4 | 83.8 |

CAPACITY RETENTION OF EACH SAMPLE AFTER 200 CYCLES

CAPACITY RETENTION OF EACH SAMPLE AFTER 200 CYCLES

POSITIVE ELECTRODE OF LITHIUM ION SECONDARY BATTERY, AND METHOD OF MANUFACTURING LITHIUM ION SECONDARY BATTERY

BACKGROUND OF THE INVENTION

1. Field of the Invention

The present invention relates to a positive electrode of a lithium ion secondary battery, and a method of manufacturing a lithium ion secondary battery.

2. Description of Related Art

A lithium ion secondary battery is chargeable or dischargeable by lithium ions in an electrolyte moving between a positive electrode and a negative electrode which store and release lithium ions.

Published Japanese Translation of PCT application No. 2002-527873 (JP-A-2002-527873) discloses a technique regarding a lithium ion polymer battery. In the technique disclosed in JP-A-2002-527873, in order to improve battery characteristics, an insoluble lithium compound such as $Li_3PO_4$ or LiF is added to the lithium ion polymer battery. In addition, as a cathode material, a manganese oxide compound ($LiMn_2O_4$, $LiMnO_2$) is used.

One of the important characteristics of a lithium ion secondary battery is the cycle characteristics. The cycle characteristics are an index indicating to what extent a battery capacity of a lithium ion secondary battery after repetition of charging and discharging in predetermined cycles changes as compared to an initial battery capacity. In general, it is preferable that a decrease in the battery capacity after the repetition of charging and discharging be small as compared to the initial battery capacity.

In the technique disclosed in JP-A-2002-527873, in order to improve battery characteristics, an insoluble lithium compound such as $Li_3PO_4$ or LiF is added to the lithium ion polymer battery. However, as a result of investigation, the present inventors initially found that, in a lithium ion secondary battery in which lithium nickel manganese oxide is used as a positive electrode active material, cycle characteristics of the lithium ion secondary battery cannot be improved to a sufficient value with only the addition of $Li_3PO_4$ or LiF.

SUMMARY OF THE INVENTION

The invention has been made to provide a positive electrode of a lithium ion secondary battery capable of further improving cycle characteristics, and a method of manufacturing a lithium ion secondary battery.

According to a first aspect of the invention, there is provided a positive electrode of a lithium ion secondary battery, the positive electrode including a positive electrode active material that contains lithium nickel manganese oxide, in which a coating film containing amorphous lithium fluoride and amorphous lithium phosphate is formed on a surface of the positive electrode active material.

According to a second aspect of the invention, there is provided a method of manufacturing a lithium ion secondary battery. This method includes: exposing lithium nickel manganese oxide, which is a positive electrode active material, to fluorine-based gas to form a coating film containing amorphous lithium fluoride on a surface of the positive electrode active material; adding a phosphate compound to the positive electrode active material, on which the coating film containing the lithium fluoride is formed, to prepare a positive electrode containing the positive electrode active material; forming a lithium ion secondary battery including the prepared positive electrode; and charging the formed lithium ion secondary battery to form a coating film containing amorphous lithium phosphate on the surface of the positive electrode active material.

According to a third aspect of the invention, there is provided a method of manufacturing a lithium ion secondary battery. This method includes: adding a fluorine compound and a phosphate compound to lithium nickel manganese oxide, which is a positive electrode active material, to prepare a positive electrode containing the positive electrode active material; forming a lithium ion secondary battery including the positive electrode; and charging the formed lithium ion secondary battery to form a coating film containing amorphous lithium fluoride and amorphous lithium phosphate on a surface of the positive electrode active material.

According to the invention, the coating film containing amorphous lithium fluoride and amorphous lithium phosphate is formed on the surface of the positive electrode active material. Here, the amorphous coating film has lower lithium ion diffusion resistance (in other words, higher lithium ion conductivity) than that of a crystalline coating film. Accordingly, by forming the amorphous coating film on the surface of the positive electrode active material, the lithium ion diffusion resistance of the surface of the positive electrode active material can be reduced. Therefore, cycle characteristics of the lithium ion secondary battery can be further improved.

According to the invention, a positive electrode of a lithium ion secondary battery capable of further improving cycle characteristics, and a method of manufacturing a lithium ion secondary battery can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flowchart illustrating a second method of manufacturing a lithium ion secondary battery according to an embodiment of the invention;

FIG. 3 is a table illustrating a relationship between the amount of LiF, the amount of $Li_3PO_4$, and the capacity retention (after 200 cycles) of each sample;

DETAILED DESCRIPTION OF EMBODIMENTS

Figure 1:
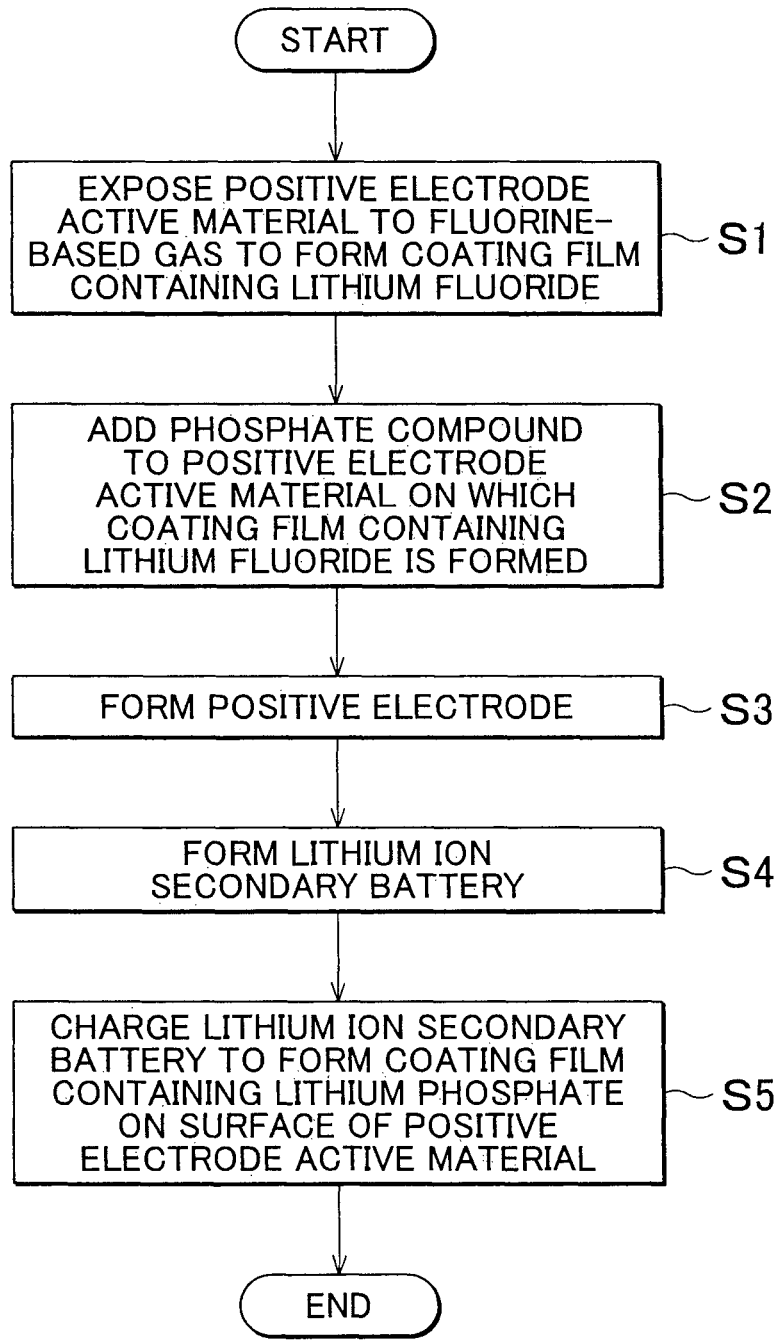
FIG. 1 is a flowchart illustrating a first method of manufacturing a lithium ion secondary battery according to an embodiment of the invention.

Hereinafter, a positive electrode of lithium ion secondary battery, and a method of manufacturing a lithium ion secondary battery according to an embodiment of the invention will be described. In regard to the method of manufacturing a lithium ion secondary battery according to the embodiment, FIG. 1 illustrates a first method, and FIG. 2 illustrates a second method. First, the first method will be described.

<First Method of Manufacturing Lithium Ion Secondary Battery>

FIG. 1 is a flowchart illustrating the first method of manufacturing a lithium ion secondary battery according to the embodiment.

In the first method of manufacturing a lithium ion secondary battery according to the embodiment, first, a positive electrode active material is exposed to fluorine-based gas to form a coating film containing amorphous lithium fluoride on a surface of the positive electrode active material (Step S1). In other words, fluorine atoms are made to be adsorbed on the surface of the positive electrode active material to treat the surface of the positive electrode active material. At this time, the coating film containing lithium fluoride is formed by making fluorine adsorbed on the surface of the positive electrode active material (that is, the coating film is formed without heating). Therefore, the coating film is amorphous without being crystalline.

As the positive electrode active material, a material capable of storing and releasing lithium can be used, and in the embodiment, lithium nickel manganese oxide (LiNi$_x$Mn$_{2-x}$O$_4$; 0<x<2) can be used. An example of the composition of lithium nickel manganese oxide is LiNi$_{0.5}$Mn$_{1.5}$O$_4$ (x=0.5).

As the fluorine-based gas, for example, fluorine gas ($F_2$), nitrogen trifluoride gas ($NF_3$), or carbon tetrafluoride gas ($CF_4$) can be used. In the embodiment, the fluorine-based gas is not limited to these gases, and any gas may be used as long as it can supply fluorine atoms to the surface of the positive electrode active material.

Next, a phosphate compound is added to the positive electrode active material on which the coating film containing the lithium fluoride is formed (Step S2). Here, as the phosphate compound, lithium phosphate ($Li_3PO_4$), lithium pyrophosphate ($Li_4P_2O_7$), or lithium metaphosphate ($LiPO_3$) can be used. In the embodiment, the phosphate compound is not limited to these examples, and any material may be used as long as it can supply phosphoric acid to the surface of the positive electrode active material.

Next, a positive electrode is formed using the positive electrode active material treated as described above (Step S3). During the formation of the positive electrode, a conductive material and a binder are mixed with the positive electrode active material treated as described above, and this mixture is put into NMP (N-methyl-2-pyrrolidone) or the like and is kneaded. A positive electrode current collector is coated with the kneaded positive electrode mixture, is dried, and is pressed. As a result, a positive electrode can be formed.

As the conductive material, for example, acetylene black (AB) or a graphite-based material can be used. As the binder, for example, polyvinylidene fluoride (PVdF), styrene-butadiene rubber (SBR), polytetrafluoroethylene (PTFE), or carboxymethyl cellulose (CMC) can be used. As the positive electrode current collector, aluminum or an alloy containing aluminum as a major component can be used.

Next, a lithium ion secondary battery is formed (Step S4). A negative electrode can be formed by kneading a negative electrode active material and a binder with a solvent (water), coating a negative electrode current collector with the kneaded negative electrode mixture, drying the negative electrode mixture, and pressing the dried negative electrode mixture. The negative electrode active material can store and release lithium ions, and for example, a powdered carbon material formed of natural graphite or the like can be used.

As the binder, the above-described exemplary binders can be used. As the negative electrode current collector, for example, copper, nickel, or an alloy thereof can be used.

The positive electrode and the negative electrode formed as above and a separator are laminated such that the separator is interposed between both of the electrodes, and then the laminate is made to have a structure of being wound flat (wound electrode body). The wound electrode body is accommodated in a container having a shape in which the wound electrode body can be accommodated. The container includes: a flat rectangular container body having an open upper end; and a lid that covers the opening. As a material constituting the container, a metal material such as aluminum or steel can be used. In addition, for example, a container obtained by molding a resin material such as polyphenylene sulfide resin (PPS) or polyimide resin may also be used. In a top surface (that is, the lid) of the container, a positive electrode terminal, which is electrically connected to the positive electrode of the wound electrode body, and a negative electrode terminal, which is electrically connected to the negative electrode of the wound electrode body, are provided. In addition, the inside of the container is filled with an electrolyte. The above-described configuration of the lithium ion secondary battery is merely exemplary, and the configuration of the lithium ion secondary battery (that is, the configurations of the electrode body and the container) according to the embodiment is not limited thereto.

As the separator, a porous polymer film such as a porous polyethylene film, a porous polyolefin film, or a porous polyvinyl chloride film; or a lithium ion or ion conductive polymer electrolyte film can be used alone or in a combination of two or more kinds thereof.

The electrolyte is a composition containing a supporting electrolyte in a non-aqueous solvent. As the non-aqueous solvent, one kind or two or more kinds of materials selected from the group consisting of propylene carbonate (PC), ethylene carbonate (EC), diethyl carbonate (DEC), dimethyl carbonate (DMC), ethyl methyl carbonate (EMC), and the like can be used. In addition, as the supporting electrolyte, one kind or two or more kinds of lithium compounds (lithium salts) selected from the group consisting of $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$, and the like can be used.

Next, the lithium ion secondary battery formed as described above is charged (initial charge) to form a coating film containing amorphous lithium phosphate on the surface of the positive electrode active material (Step S5). That is, by charging the lithium ion secondary battery, the phosphate compound added in Step S2 electrochemically reacts on the surface of the positive electrode active material to form the coating film containing lithium phosphate.

In the embodiment, since the coating film is formed using the electrochemical reaction (that is, the reaction at a low temperature), the formed coating film containing lithium phosphate is amorphous without being crystalline. In addition, in the embodiment, since the phosphate compound is added to only the positive electrode, the coating film containing lithium phosphate is formed on only the surface of the positive electrode active material.

By using the above-described first method of manufacturing a lithium ion secondary battery, the positive electrode of the lithium ion secondary battery in which the coating film containing amorphous lithium fluoride and amorphous lithium phosphate is formed on the surface of the positive electrode active material, and the lithium ion secondary battery can be manufactured.

In the embodiment, in this way, the coating film containing amorphous lithium fluoride and amorphous lithium phosphate is formed on the surface of the positive electrode active material. Here, the amorphous coating film has lower lithium ion diffusion resistance (in other words, higher lithium ion conductivity) than that of a crystalline coating film. Accordingly, by forming the amorphous coating film on the surface of the positive electrode active material, the lithium ion diffusion resistance of the surface of the positive electrode active material can be reduced. Therefore, cycle characteristics of the lithium ion secondary battery can be improved. In addition, in the embodiment, since the coating film is formed on the surface of the positive electrode active material in this way, hydrogen fluoride present in the electrolyte can be inhibited from adversely affecting the positive electrode active material.

In the embodiment, the amount of lithium fluoride (that is, the amount of lithium fluoride formed as the coating film) with respect to lithium nickel manganese oxide which is the positive electrode active material is preferably 0.05 wt % to 1 wt %, more preferably 0.1 wt % to 0.5 wt %, and still more preferably 0.3 wt %. For example, when the amount of lithium fluoride with respect to lithium nickel manganese oxide is less than 0.05 wt %, the amount of the coating film containing lithium fluoride is excessively small, and thus hydrogen fluoride present in the electrolyte cannot be sufficiently inhibited from adversely affecting the positive electrode active material. In addition, when the amount of lithium fluoride with respect to lithium nickel manganese oxide is more than 1 wt %, the amount of lithium fluoride which is an insulating body is excessively large, and thus the resistance of the surface of the positive electrode active material increases.

For example, by adjusting the amount of the fluorine-based gas supplied to the positive electrode active material during the formation of the coating film in Step S1, the amount of the coating film containing lithium fluoride formed on the surface of the positive electrode active material can be adjusted.

In addition, in the embodiment, when lithium phosphate is added as the phosphate compound, the addition amount of lithium phosphate with respect to lithium nickel manganese oxide which is the positive electrode active material is preferably 0.5 wt % to 3 wt %, more preferably 0.75 wt % to 1.5 wt %, and still more preferably 1 wt %. For example, when the addition amount of lithium phosphate with respect to lithium nickel manganese oxide is less than 0.5 wt %, the amount of the coating film containing the phosphate compound is excessively small, and thus hydrogen fluoride present in the electrolyte cannot be sufficiently inhibited from adversely affecting the positive electrode active material. In addition, when the addition amount of lithium phosphate with respect to lithium nickel manganese oxide is more than 3 wt %, the resistance of the surface of the positive electrode active material increases. In addition, since the amount of lithium phosphate with respect to the positive electrode active material increases, the battery capacity decreases.

For example, by adjusting the amount of the phosphate compound (lithium phosphate) added in Step S2, the amount of the coating film containing lithium phosphate formed on the surface of the positive electrode active material can be adjusted.

In addition, in the first method of manufacturing a lithium ion secondary battery according to the embodiment, after the phosphate compound is added to the positive electrode active material in Step S2, the positive electrode active material and the phosphate compound may be mixed while applying a shearing energy thereto. In this way, by mixing the positive electrode active material and the phosphate compound while applying a shearing energy thereto, the phosphate compound is temporarily dissolved in a positive electrode paste and then is redeposited in an amorphous state.

In this case, the coating film containing amorphous lithium phosphate is electrochemically formed on the surface of the positive electrode active material by charging (initial charge) the lithium ion secondary battery, and the shearing energy is applied during the mixing. As a result, lithium phosphate (phosphate compound) can be made to be in an amorphous state. Accordingly, the coating film containing amorphous lithium phosphate can be efficiently formed on the surface of the positive electrode active material.

In addition, in the first method of manufacturing a lithium ion secondary battery according to the embodiment, the positive electrode active material is exposed to the fluorine-based gas to form the coating film containing amorphous lithium fluoride on the surface of the positive electrode active material (Step S1). Therefore, the coating film can be uniformly formed on the surface of the positive electrode active material. In addition, since the phosphate compound is added to only the positive electrode (Step S2), the coating film containing the phosphate compound can be formed on only the surface of the positive electrode active material (that is, an effect of the phosphate compound on the negative electrode can be inhibited).

<Second Method of Manufacturing Lithium Ion Secondary Battery>

Next, the second method of manufacturing a lithium ion secondary battery will be described. FIG. 2 is a flowchart illustrating the second method of manufacturing a lithium ion secondary battery according to the embodiment.

In the second method of manufacturing a lithium ion secondary battery according to the embodiment, first, a fluorine compound and a phosphate compound are added to a positive electrode active material (Step S11). As the positive electrode active material, a material capable of storing and releasing lithium can be used, and in the embodiment, lithium nickel manganese oxide ($LiNi_xMn_{2-x}O_4$: $0<x<2$) can be used. An example of the composition of lithium nickel manganese oxide is $LiNi_{0.5}Mn_{1.5}O_4$ (x=0.5).

As the fluorine compound, for example, lithium fluoride (LiF), aluminum fluoride ($AlF_3$), magnesium fluoride ($MgF_2$), or nickel fluoride ($NiF_2$) can be used. In the embodiment, the fluorine compound is not limited to these examples, and any material may be used as long as it can supply fluorine to the surface of the positive electrode active material.

As the phosphate compound, lithium phosphate ($Li_3PO_4$), lithium pyrophosphate ($Li_4P_2O_7$), or lithium metaphosphate ($LiPO_3$) can be used. In the embodiment, the phosphate compound is not limited to these examples, and any material may be used as long as it can supply phosphoric acid to the surface of the positive electrode active material.

Next, a positive electrode is formed using the positive electrode active material to which the fluorine compound and the phosphate compound are added (Step S12). During the formation of the positive electrode, a conductive material and a binder are mixed with the positive electrode active material to which the fluorine compound and the phosphate compound are added, and this mixture is put into NMP (N-methyl-2-pyrrolidone) or the like and is kneaded. A positive electrode current collector is coated with the kneaded positive electrode mixture, is dried, and is pressed. As a result, a positive electrode can be formed. Since the conductive material and the binder used during the formation of the positive electrode are the same as described above in Step S3 of the first method, the description thereof will not be repeated.

Next, a lithium ion secondary battery is formed (Step S13). Since the method of forming a lithium ion secondary battery is the same as described above in S4 of the first method, the description thereof will not be repeated.

Next, the lithium ion secondary battery formed in Step S13 is charged (initial charge) to form a coating film containing amorphous lithium fluoride and amorphous lithium phosphate on the surface of the positive electrode active material (Step S14). That is, by charging the lithium ion secondary battery, the fluorine compound and the phosphate compound added in Step S11 electrochemically react on the surface of the positive electrode active material to form the coating film containing lithium fluoride and lithium phosphate.

In the embodiment, since the coating film is formed using the electrochemical reaction (that is, the reaction at a low temperature), the formed coating film containing lithium fluoride and lithium phosphate is amorphous without being crystalline. In addition, in the embodiment, since the fluorine compound and the phosphate compound are added to only the positive electrode, the coating film containing lithium fluoride and lithium phosphate is formed on only the surface of the positive electrode active material.

By using the above-described second method of manufacturing a lithium ion secondary battery, the positive electrode of the lithium ion secondary battery in which the coating film containing amorphous lithium fluoride and amorphous lithium phosphate is formed on the surface of the positive electrode active material, and the lithium ion secondary battery can be manufactured. Even in this case, due to the same reason as described in the first method, cycle characteristics of the lithium ion secondary battery can be improved.

In the embodiment, when lithium fluoride is added as the fluorine compound, due to the same reason as described in the first method, the addition amount of lithium fluoride with respect to lithium nickel manganese oxide which is the positive electrode active material is preferably 0.05 wt % to 1 wt %, more preferably 0.1 wt % to 0.5 wt %, and still more preferably 0.3 wt %. For example, by adjusting the addition amount of the fluorine compound (lithium fluoride) added in Step S11, the amount of the coating film containing lithium fluoride formed on the surface of the positive electrode active material can be adjusted.

In addition, in the embodiment, when lithium phosphate is added as the phosphate compound, due to the same reason as described in the first method, the addition amount of lithium phosphate with respect to lithium nickel manganese oxide which is the positive electrode active material is preferably 0.5 wt % to 3 wt %, more preferably 0.75 wt % to 1.5 wt %, and still more preferably 1 wt %. For example, by adjusting the amount of the phosphate compound (lithium phosphate) added in Step S11, the amount of the coating film containing lithium phosphate formed on the surface of the positive electrode active material can be adjusted.

In addition, in the second method of manufacturing a lithium ion secondary battery according to the embodiment, after the fluorine compound and the phosphate compound is added to the positive electrode active material in Step S11, the positive electrode active material, the fluorine compound, and the phosphate compound may be mixed while applying a shearing energy thereto. In this way, by mixing these materials while applying a shearing energy thereto, the fluorine compound and the phosphate compound are temporarily dissolved in a positive electrode paste and then are redeposited in an amorphous state.

In this case, the coating film containing amorphous lithium fluoride and amorphous lithium phosphate is electrochemically formed on the surface of the positive electrode active material by charging (initial charge) the lithium ion secondary battery, and the shearing energy is applied during the mixing. As a result, lithium fluoride (fluorine compound) and lithium phosphate (phosphate compound) can be made to be in an amorphous state. Accordingly, the coating film containing amorphous lithium fluoride and amorphous lithium phosphate can be efficiently formed on the surface of the positive electrode active material.

In addition, in the above-described second method, since the fluorine compound and the phosphate compound are added to only the positive electrode (Step S11), the coating film containing lithium fluoride and lithium phosphate can be formed on only the surface of the positive electrode active material (that is, an effect of the fluorine compound and the phosphate compound on the negative electrode can be inhibited).

In addition, in the first method, the positive electrode active material is exposed to the fluorine-based gas to form the coating film containing amorphous lithium fluoride on the surface of the positive electrode active material (Step S1). Next, the phosphate compound is added to the positive electrode active material on which the coating film containing lithium fluoride is formed (Step S2). On the other hand, in the second method, the fluorine compound and the phosphate compound are added to lithium nickel manganese oxide in Step S11, and the coating film containing lithium fluoride and lithium phosphate is electrochemically formed on the surface of the positive electrode active material in Step S14. Accordingly, the manufacturing steps of the second method can be made to be simpler than those of the first method.

Although the first method and the second method are different from each other, the positive electrodes of the lithium ion secondary batteries which are formed using these methods are substantially the same.

In addition, whether or not the formed coating film is amorphous can be determined using, for example, a transmission electron microscope (TEM). That is, during the observation of the coating film on the surface of the positive electrode active material using a transmission electron microscope, when a lattice fringe is observed, it can be determined that the coating film is crystalline, and when a lattice fringe is not observed, it can be determined that the coating film is amorphous.

In addition, whether or not the formed coating film is amorphous may be determined, for example, using electron beam diffraction. That is, when a diffraction pattern of the coating film on the surface of the positive electrode active material is made of diffraction spots, it can be determined that the coating film is crystalline, and when a clear diffraction pattern is not obtained (halo pattern), it can be determined that the coating film is amorphous.

In addition, the effects of the embodiment of the invention are particularly high in the lithium ion secondary battery in which lithium nickel manganese oxide is used as the positive electrode active material. That is, in the lithium ion secondary battery in which lithium nickel manganese oxide is used as the positive electrode active material, the operation voltage is high (4.5 V or higher), and thus a reaction between the positive electrode active material and the electrolyte is promoted. Therefore, decomposition of the electrolyte is promoted, and the amount of hydrogen fluoride present in the electrolyte increases. The amount of hydrogen fluoride is more than that of, for example, a lithium ion secondary battery (operation voltage: about 4.1 V) in which lithium nickel manganese cobalt oxide ($LiNi_{1/3}Co_{1/3}Mn_{1/3}O_2$) is used as the positive electrode active material.

Therefore, in order to inhibit hydrogen fluoride present in the electrolyte from adversely affecting the positive electrode active material, it is necessary to form the coating film on the surface of the positive electrode active material. However, when the coating film (crystalline coating film) is formed on the surface of the positive electrode active material, the lithium ion diffusion resistance of the surface of the positive electrode active material increases, and cycle characteristics of the lithium ion secondary battery deteriorate.

Therefore, in the embodiment of the invention, the coating film containing amorphous lithium fluoride and amorphous lithium phosphate is formed on the surface of the positive electrode active material. Here, the amorphous coating film has lower lithium ion diffusion resistance (in other words, higher lithium ion conductivity) than that of a crystalline coating film. Accordingly, by forming the amorphous coating film on the surface of the positive electrode active material, the lithium ion diffusion resistance of the surface of the positive electrode active material can be reduced. Therefore, cycle characteristics of the lithium ion secondary battery can be improved. That is, according to the embodiment of the invention, cycle characteristics of a lithium ion secondary battery can be improved while reducing the effect of hydrogen fluoride present in an electrolyte.

Next, Examples of the invention will be described. In order to investigate an effect during formation of a coating film on a surface of a positive electrode active material, the following samples were prepared.

Example 1

A lithium ion secondary battery was prepared using the above-described first method. As the positive electrode active material, $LiNi_{0.5}Mn_{1.5}O_4$ was used. In addition, the positive electrode active material was exposed to fluorine gas so as to fluorinate the surface of the positive electrode active material. At this time, fluorination conditions were adjusted such that 0.3 wt % of a LiF coating film with respect to the positive electrode active material was formed. The amount of LiF formed on the surface of the positive electrode active material was measured using X-ray photoelectron spectroscopy (XPS). Hereinafter, $LiNi_{0.5}Mn_{1.5}O_4$ on which 0.3 wt % of LiF was formed will be referred to as "$0.3F—LiNi_{0.5}Mn_{1.5}O_4$".

Next, a phosphate compound, a conductive material, and a binder were mixed with $0.3F—LiNi_{0.5}Mn_{1.5}O_4$. $Li_3PO_4$ was used as the phosphate compound, acetylene black (AB) was used as the conductive material, and polyvinylidene fluoride (PVdF) was used as the binder. At this time, these components were mixed with each other such that the addition amount of the phosphate compound ($Li_3PO_4$) was 1 wt %. Specifically, the components were mixed such that a weight ratio (Positive Electrode Active Material ($0.3F—LiNi_{0.5}Mn_{1.5}O_4$):Phosphate Compound ($Li_3PO_4$):Conductive Material (AB):Binder (PVdF)) thereof was 92.07:0.93:4:3.

Next, this mixture was dissolved in a solvent (N-methyl-2-pyrrolidone) and was kneaded. A positive electrode current collector (aluminum foil) was coated with the kneaded positive electrode mixture, was dried, and was pressed. As a result, a positive electrode was formed. In the positive electrode, the weight per unit area of a single surface was 16.2 mg/cm$^2$, and the density was 2.8 g/cm$^3$.

In addition, during formation of a negative electrode, natural graphite (negative electrode active material), carboxymethyl cellulose (CMC), and styrene-butadiene rubber (SBR) were mixed at a weight ratio of 98.6:0.7:0.7. Next, this mixture was dissolved in a solvent (water) and was kneaded. A negative electrode current collector (copper foil) was coated with the kneaded negative electrode mixture, was dried, and was pressed. As a result, a negative electrode was formed. In the negative electrode, the weight per unit area of a single surface was 7.4 mg/cm$^2$, and the density was 1.3 g/cm$^3$.

A separator was interposed between the positive electrode and the negative electrode prepared as above to form an electrode body. As the separator, a porous polyethylene film was used. This electrode body was accommodated in a bag-shaped container formed of a laminated film, and an electrolyte was poured thereinto. As a result, a lithium ion secondary battery was prepared. As the electrolyte, a mixture was used in which 1 mol/L (dm$_3$) of $LiPF_6$ as a lithium salt was mixed with a mixed solvent (EC/EMC=5/5) of ethylene carbonate (EC) and ethyl methyl carbonate (EMC). Next, the prepared lithium ion secondary battery was charged (initial charge) to form a coating film on the surface of the positive electrode active material.

Example 2

As in the case of Example 1, $LiNi_{0.5}Mn_{1.5}O_4$ was used as the positive electrode active material. In addition, the positive electrode active material was exposed to fluorine gas so as to fluorinate the surface of the positive electrode active material. In Example 2, fluorination conditions were adjusted such that 0.1 wt % of a LiF coating film with respect to the positive electrode active material was formed.

Next, a phosphate compound, a conductive material, and a binder were mixed with $0.1F—LiNi_{0.5}Mn_{1.5}O_4$. $Li_3PO_4$ was used as the phosphate compound, acetylene black (AB) was used as the conductive material, and polyvinylidene fluoride (PVdF) was used as the binder. At this time, these components were mixed with each other such that the addition amount of the phosphate compound ($Li_3PO_4$) was 1 wt %. Specifically, the components were mixed such that a weight ratio (Positive Electrode Active Material ($0.1F—LiNi_{0.5}Mn_{1.5}O_4$):Phosphate Compound ($Li_3PO_4$):Conductive Material (AB):Binder (PVdF)) thereof was 92.07:0.93:4:3. Next, using the same method as that of Example 1, a lithium ion secondary battery according to Example 2 was prepared.

Example 3

A lithium ion secondary battery was prepared using the above-described second method. First, a positive electrode active material, a fluorine compound, and a phosphate compound were mixed, and a conductive material and a binder were further mixed the mixture. $LiNi_{0.5}Mn_{1.5}O_4$ was used as the positive electrode active material, LiF was used as the fluorine compound, $Li_3PO_4$ was used as the phosphate compound, acetylene black (AB) was used as the conductive material, and polyvinylidene fluoride (PVdF) was used as the binder. At this time, the components were mixed such that the addition amount of the fluorine compound (LiF) was 0.3 wt %, and the addition amount of the phosphate compound ($Li_3PO_4$) was 1 wt %. Specifically, the components were mixed such that a weight ratio (Positive Electrode Active Material ($LiNi_{0.5}Mn_{1.5}O_4$):Fluorine Compound (LiF):Phosphate Compound ($Li_3PO_4$):Conductive Material (AB):Binder (PVdF)) thereof was 91.791:0.279:0.93:4:3. Next, using the same method as that of Example 1, a lithium ion secondary battery according to Example 3 was prepared.

Example 4

A lithium ion secondary battery was prepared using the above-described second method. First, a positive electrode active material, a fluorine compound, and a phosphate compound were mixed, and a conductive material and a binder were further mixed the mixture. $LiNi_{0.5}Mn_{1.5}O_4$ was used as the positive electrode active material, LiF was used as the fluorine compound, $Li_3PO_4$ was used as the phosphate compound, acetylene black (AB) was used as the conductive material, and polyvinylidene fluoride (PVdF) was used as the binder. At this time, the components were mixed such that the addition amount of the fluorine compound (LiF) was 0.1 wt %, and the addition amount of the phosphate compound ($Li_3PO4$) was 1 wt %. Specifically, the components were mixed such that a weight ratio (Positive Electrode Active Material ($LiNi_{0.5}Mn_{1.5}O_4$):Fluorine Compound (LiF):Phosphate Compound ($Li_3PO_4$):Conductive Material (AB):Binder (PVdF)) thereof was 91.977:0.093:0.93:4:3. Next, using the same method as that of Example 1, a lithium ion secondary battery according to Example 4 was prepared.

Comparative Example 1

In Comparative Example 1, a lithium ion secondary battery in which additives (LiF, $Li_3PO_4$) were not added to a positive electrode active material was prepared. First, the positive electrode active material, a conductive material, and a binder were mixed. $LiNi_{0.5}Mn_{1.5}O_4$ was used as the positive electrode active material, acetylene black (AB) was used as the conductive material, and polyvinylidene fluoride (PVdF) was used as the binder. At this time, the components were mixed such that a weight ratio (Positive Electrode Active Material ($LiNi_{0.5}Mn_{1.5}O_4$):Conductive Material (AB):Binder (PVdF)) thereof was 93:4:3. Next, using the same method as that of Example 1, a lithium ion secondary battery according to Comparative Example 1 was prepared.

Comparative Example 2

In Comparative Example 2, a lithium ion secondary battery in which additives (LiF, $Li_3PO_4$) were added to an electrolyte was prepared. First, the positive electrode active material, a conductive material, and a binder were mixed. $LiNi_{0.5}Mn_{1.5}O_4$ was used as the positive electrode active material, acetylene black (AB) was used as the conductive material, and polyvinylidene fluoride (PVdF) was used as the binder. At this time, the components were mixed such that a weight ratio (Positive Electrode Active Material ($LiNi_{0.5}Mn_{1.5}O_4$):Conductive Material (AB):Binder (PVdF)) thereof was 93:4:3. Next, using the same method as that of Example 1, a lithium ion secondary battery according to Comparative Example 2 was prepared. In the lithium ion secondary battery according to Comparative Example 2, 0.3 wt % of LiF and 1 wt % of $Li_3PO_4$ were added to the electrolyte.

Comparative Example 3

In Comparative Example 3, a lithium ion secondary battery in which a coating film containing a crystalline fluorine compound (LiF) and a crystalline phosphate compound ($Li_3PO_4$) was formed on the surface of the positive electrode active material was prepared. First, for $LiNi_{0.5}Mn_{1.5}O_4$ which was a positive electrode active material, a mixed solution in which lithium nitrate ($LiNO_3$), ammonium fluoride ($NH_4F$), and diammonium hydrogenphosphate [$(NH_4)_2HPO_4$] were dissolved was prepared. The positive electrode active material was coated with the mixed solution using a spray drying method (tumbling fluidized bed granulating-coating method), followed by firing at 400° C. for 4 hours. At this time, coating conditions were adjusted such that the coating amount of the fluorine compound (LiF) was 0.3 wt %, and the coating amount of the phosphate compound ($Li_3PO_4$) was 1 wt % with respect to the positive electrode active material.

Next, the coated positive electrode active material, a conductive material, and a binder were mixed. Acetylene black (AB) was used as the conductive material, and polyvinylidene fluoride (PVdF) was used as the binder. At this time, the components were mixed such that a weight ratio (Positive Electrode Active Material ($LiNi_{0.5}Mn_{1.5}O_4$):Conductive Material (AB):Binder (PVdF)) thereof was 93:4:3. Next, using the same method as that of Example 1, a lithium ion secondary battery according to Comparative Example 3 was prepared.

Comparative Example 4

In Comparative Example 4, a lithium ion secondary battery in which a phosphate compound was added (a fluorine compound was not added) to a positive electrode active material was prepared. First, the positive electrode active material, the phosphate compound, a conductive material, and a binder were mixed. $LiNi_{0.5}Mn_{1.5}O_4$ was used as the positive electrode active material, $Li_3PO_4$ was used as the phosphate compound, acetylene black (AB) was used as the conductive material, and polyvinylidene fluoride (PVdF) was used as the binder. At this time, these components were mixed with each other such that the addition amount of $Li_3PO_4$ was 1 wt %. Specifically, the components were mixed such that a weight ratio (Positive Electrode Active Material ($LiNi_{0.5}Mn_{1.5}O_4$):Phosphate Compound ($Li_3PO_4$):Conductive Material (AB):Binder (PVdF)) thereof was 92.07:0.93:4:3. Next, using the same method as that of Example 1, a lithium ion secondary battery according to Comparative Example 4 was prepared.

Comparative Example 5

In Comparative Example 5, a lithium ion secondary battery in which a fluorine compound was added (a phosphate compound was not added) to a positive electrode active material was prepared. First, the positive electrode active material, the fluorine compound, a conductive material, and a binder were mixed. $LiNi_{0.5}Mn_{1.5}O_4$ was used as the positive electrode active material, LiF was used as the fluorine compound, acetylene black (AB) was used as the conductive material, and polyvinylidene fluoride (PVdF) was used as the binder. At this time, these components were mixed with each other such that the addition amount of LiF was 0.3 wt %. Specifically, the components were mixed such that a weight ratio (Positive Electrode Active Material ($LiNi_{0.5}Mn_{1.5}O_4$):Fluorine Compound (LiF):Conductive Material (AB):Binder (PVdF)) thereof was 92.72:0.28:4:3. Next, using the same method as that of Example 1, a lithium ion secondary battery according to Comparative Example 5 was prepared.

<Measurement of Capacity Retention>

In order to investigate durability characteristics of the prepared lithium ion secondary batteries, the capacity retention of each of the lithium ion secondary batteries was measured. During the measurement of the capacity retention, each of the lithium ion secondary batteries was charged and discharged in 200 cycles at 60° C. in a voltage range of 3.5 V to 4.9 V at a charge and discharge rate of 2 C. The discharge capacity in the first cycle was 100%, and the capacity retention in each cycle was evaluated.

Figure 4:
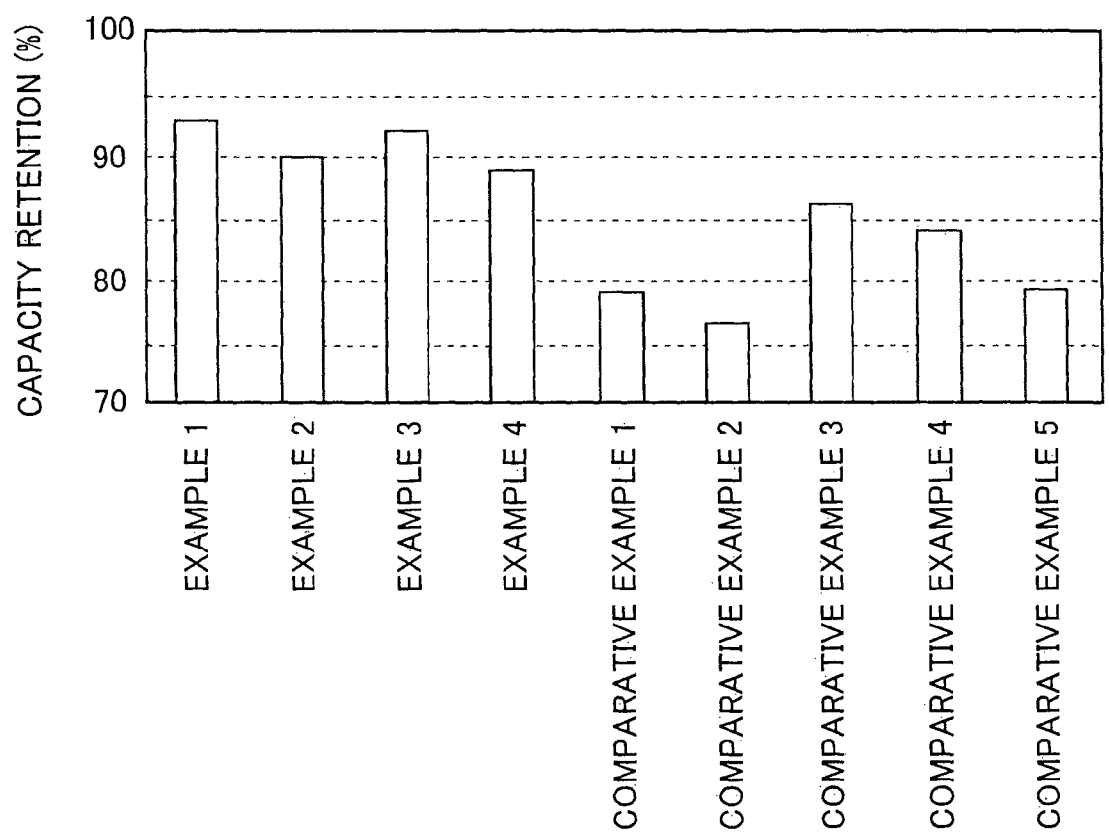
FIG. 4 is a graph illustrating the capacity retention (after 200 cycles) of each sample.

FIG. 3 is a table illustrating a relationship between the amount of LiF, the amount of $Li_3PO_4$, and the capacity retention (capacity retention of the 200-th cycle) of each sample. FIG. 4 is a graph illustrating the capacity retention of each sample. As illustrated in FIGS. 3 and 4, the capacity retentions (93.0%, 89.9%) of the lithium ion secondary batteries according to Examples 1 and 2 which were formed using the first method and the capacity retentions (92.1%, 89.0%) of the lithium ion secondary batteries according to Examples 3 and 4 which were formed using the second method were higher than the capacity retention (79.2%) of the lithium ion secondary battery according to Comparative Example 1 to which the additives (LiF, $Li_3PO_4$) were not added. Accordingly, the capacity retention of the lithium ion secondary battery was improved by forming the coating film containing amorphous lithium fluoride and amorphous lithium phosphate on the surface of the positive electrode active material.

In addition, in Comparative Example 2, the capacity retention was 76.7%, and the capacity retention of the lithium ion secondary battery was not improved only with the addition of the additives (LiF, $Li_3PO_4$) to the electrolyte.

In Comparative Example 3, the capacity retention was 86.3%. That is, when the coating film containing crystalline LiF and crystalline $Li_3PO_4$ was formed on the surface of the positive electrode active material, the capacity retention was lower than those of Examples 1 to 4 in which the amorphous coating film was formed. The reason can be presumed to be that the lithium ion diffusion resistance of the crystalline LiF and $Li_3PO_4$ was higher than that of the amorphous LiF and $Li_3PO_4$.

In addition, among the additives (LiF and $Li_3PO_4$), when only $Li_3PO_4$ was added (Comparative Example 4), the capacity retention was 84.3%, and when only LiF was added (Comparative Example 5), the capacity retention was 79.6%. Accordingly, with the addition of only one additive among the additives (LiF and $Li_3PO_4$), the capacity retention of the lithium ion secondary battery was not significantly improved. In other words, by forming the coating film containing both LiF and $Li_3PO_4$ on the surface of the positive electrode active material, the capacity retention of the lithium ion secondary battery was significantly improved.

<Capacity Retention when Addition Amounts of Additives were Varied>

Next, when the addition amounts of the additives (LiF and $Li_3PO_4$) were varied, the capacity retention of the lithium ion secondary battery was investigated. In other words, when the amount of the coating film containing LiF and $Li_3PO_4$ formed on the surface of the positive electrode active material was varied, the capacity retention of the lithium ion secondary battery was investigated. At this time, the addition amount of LiF was varied in a range of 0 wt % to 1.5 wt %.

In addition, the addition amount of $Li_3PO_4$ was varied in a range of 0 wt % to 5 wt %. In addition, each of the lithium ion secondary batteries was prepared using the above-described second method. The method of preparing the lithium ion secondary batteries was the same as that of Example 3. The addition amount of LiF in the second method corresponds to the amount of the LiF coating film which was formed in the fluorination of the first method.

Figures 5, 6:
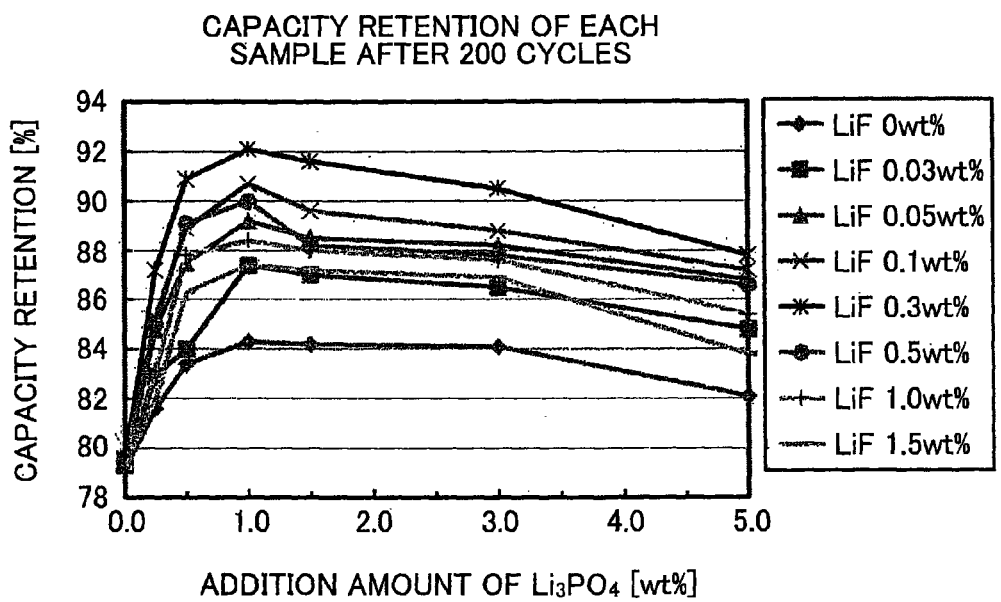
FIG. 5 is a table illustrating the relationship between the amount of LiF, the amount of $Li_3PO_4$, and the capacity retention (after 200 cycles) of each sample.
FIG. 6 is a graph illustrating the relationship between the amount of LiF, the amount of $Li_3PO_4$, and the capacity retention (after 200 cycles) of each sample.

FIG. 5 is a table illustrating a relationship between the amount of LiF, the amount of $Li_3PO_4$, and the capacity retention. FIG. 6 is a graph illustrating the relationship between the amount of LiF, the amount of $Li_3PO_4$, and the capacity retention. As illustrated in FIGS. 5 and 6, when the addition amount of LiF with respect to the positive electrode active material ($LiNi_{0.5}Mn_{1.5}O_4$) was 0.05 wt % to 1 wt %, the capacity retention of the lithium ion secondary battery was improved. In particular, when the addition amount of LiF with respect to the positive electrode active material ($LiNi_{0.5}Mn_{1.5}O_4$) was preferably 0.1 wt % to 0.5 wt % and more preferably 0.3 wt %, the capacity retention of the lithium ion secondary battery was improved.

In addition, when the addition amount of $Li_3PO_4$ with respect to the positive electrode active material ($LiNi_{0.5}Mn_{1.5}O_4$) was 0.5 wt % to 3 wt %, the capacity retention of the lithium ion secondary battery was improved. In particular, when the addition amount of $Li_3PO_4$ with respect to the positive electrode active material ($LiNi_{0.5}Mn_{1.5}O_4$) was preferably 1.0 wt % to 1.5 wt % and more preferably 1 wt %, the capacity retention of the lithium ion secondary battery was improved.

As described above, the capacity retention of the lithium ion secondary battery was able to be improved by forming the coating film containing amorphous lithium fluoride and amorphous lithium phosphate on the surface of the positive electrode active material. Accordingly, with the configurations according to the invention, cycle characteristics of the lithium ion secondary battery were able to be improved.

Hereinabove, the invention has been described using the embodiment and Examples. However, the invention is not limited to the embodiment and Examples and includes various modifications, alternations, and combinations thereof.

The invention claimed is:

1. A positive electrode of a lithium ion secondary battery, the positive electrode comprising:
    a positive electrode active material that contains lithium nickel manganese oxide,
    wherein a coating film containing amorphous lithium fluoride and amorphous lithium phosphate is formed on a surface of the positive electrode active material.

2. The positive electrode according to claim 1, wherein an amount of the lithium fluoride with respect to the lithium nickel manganese oxide is 0.05 wt % to 1 wt %.

3. The positive electrode according to claim 1, wherein an amount of the lithium phosphate with respect to the lithium nickel manganese oxide is 0.5 wt % to 3 wt %.

4. A method of manufacturing a lithium ion secondary battery, comprising:
    exposing lithium nickel manganese oxide, which is a positive electrode active material, to fluorine-based gas to form a coating film containing amorphous lithium fluoride on a surface of the positive electrode active material;
    adding a phosphate compound to the positive electrode active material, on which the coating film containing the lithium fluoride is formed, to prepare a positive electrode containing the positive electrode active material;

forming a lithium ion secondary battery including the prepared positive electrode; and charging the formed lithium ion secondary battery to form a coating film containing amorphous lithium phosphate on the surface of the positive electrode active material.

5. The method according to claim 4, wherein the positive electrode active material is exposed to the fluorine-based gas such that an amount of the lithium fluoride with respect to the lithium nickel manganese oxide is 0.05 wt % to 1 wt %.

6. The method according to claim 4, wherein when lithium phosphate is added as the phosphate compound, an addition amount of the lithium phosphate with respect to the lithium nickel manganese oxide is 0.5 wt % to 3 wt %.

7. The method according to claim 4, wherein after the phosphate compound is added to the positive electrode active material on which the coating film containing the lithium fluoride is formed, the positive electrode active material and the phosphate compound are mixed while applying a shearing energy to the positive electrode active material and the phosphate compound.

8. A method of manufacturing a lithium ion secondary battery, comprising:

adding a fluorine compound and a phosphate compound to lithium nickel manganese oxide, which is a positive electrode active material, to prepare a positive electrode containing the positive electrode active material;

forming the lithium ion secondary battery including the positive electrode; and charging the formed lithium ion secondary battery to form a coating film containing amorphous lithium fluoride and amorphous lithium phosphate on a surface of the positive electrode active material.

9. The method according to claim 8, wherein when lithium fluoride is added as the fluorine compound, an addition amount of the lithium fluoride with respect to the lithium nickel manganese oxide is 0.05 wt % to 1 wt %.

10. The method according to claim 8, wherein when lithium phosphate is added as the phosphate compound, an addition amount of the lithium phosphate with respect to the lithium nickel manganese oxide is 0.5 wt % to 3 wt %.

11. The method according to claim 8, wherein after the fluorine compound and the phosphate compound are added to the positive electrode active material, the positive electrode active material, the fluorine compound, and the phosphate compound are mixed while applying a shearing energy to the positive electrode active material, the fluorine compound, and the phosphate compound.

* * * * *